United States Patent [19]
Yazaki et al.

[11] Patent Number: 6,055,545
[45] Date of Patent: *Apr. 25, 2000

[54] UPDATING AND REFERENCE MANAGEMENT SYSTEM AND REFERENCE TIMING CONTROL SYSTEM OF SHARED MEMORY

[75] Inventors: Masatomo Yazaki; Toshiaki Gomi, both of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/366,695

[22] Filed: Dec. 30, 1994

[30] Foreign Application Priority Data

Mar. 10, 1994 [JP] Japan ..................................... 6-039787
Oct. 28, 1994 [JP] Japan ..................................... 6-265729

[51] Int. Cl.$^7$ ....................................................... G06F 13/00
[52] U.S. Cl. .............................................. 707/200; 711/153
[58] Field of Search ........................... 395/800, 474, 395/468, 200.08; 707/1, 100, 200, 201–206; 709/303; 711/153

[56] References Cited

U.S. PATENT DOCUMENTS 5,390,316  2/1995  Cramer et al. ..................... 395/200.08
5,404,482  4/1995  Stamm et al. ........................... 395/472
5,404,483  4/1995  Stamm et al. ........................... 395/471

FOREIGN PATENT DOCUMENTS 4-274533  9/1992  Japan .

*Primary Examiner*—John A. Follanabee
*Attorney, Agent, or Firm*—Staas & Halsey LLP

[57] ABSTRACT

An updating and reference management system with an area management unit and a timing unit for a shared memory. Processes access the shared memory in an identical time frame, determined by the timing unit, such that update or reference requests by the processes for the shared memory are held by the area management unit in each time interval between control signals generated by the timing unit. The update or reference requests are executed at the time of each control signal. Processing objects manage the update or reference requests for respective portions of the shared memory. The managing objects for the shared memory also pre-process potentially conflicting update requests to the same portions of the shared memory such that the shared memory is updated with different data, determined to be appropriate by the respective managing object.

8 Claims, 16 Drawing Sheets

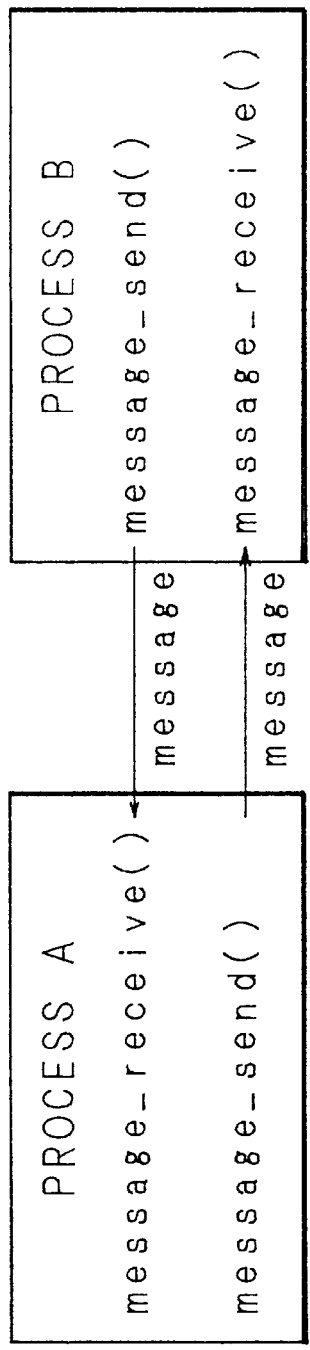
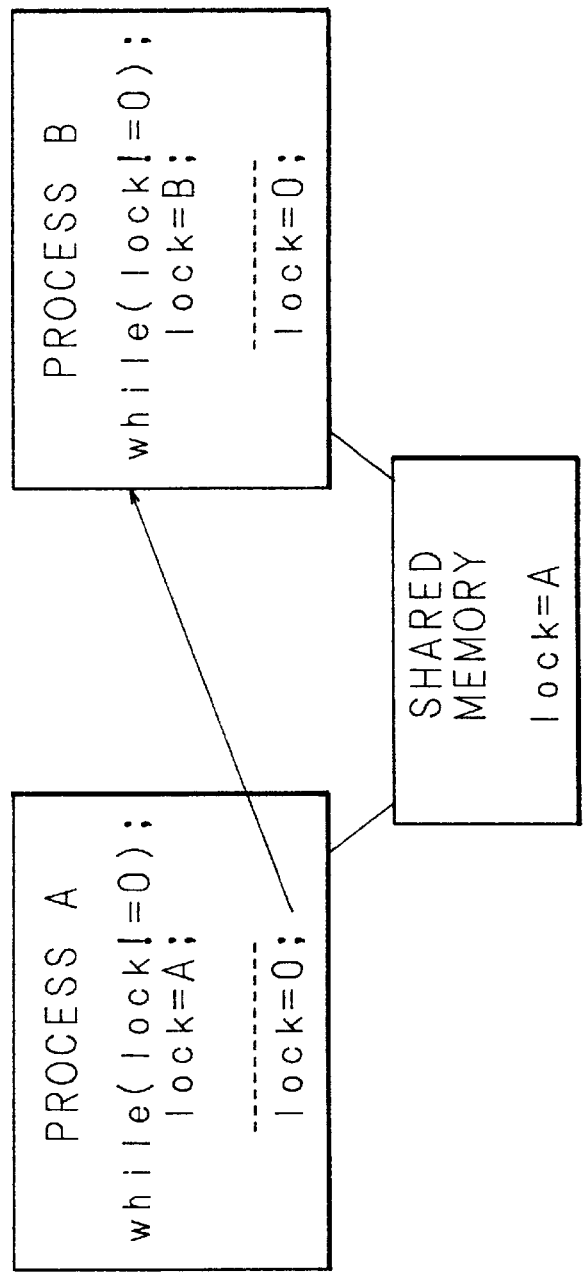
FIG. 1A PRIOR ART
FIG. 1B PRIOR ART

FIG. 13

```
OBTAIN DATA AREA ON SHARED MEMORY
REGISTER CORRESPONDING OBJECT char *buffer;
void (*func)();

func=object_function;
object_enter(&buffer,4,func);
```

⇓

OBTAIN AREA CORRESPONDING TO
DESIGNATED SIZE IN object_enter
ON SHARED MEMORY
SET IN TABLE
RETURN ADDRESS TO
REQUEST SOURCE AS RESULT

| ADDRESS | SIZE | FUNCTION |
|---------|------|----------|
| 0×1000  | 4    | object_function |

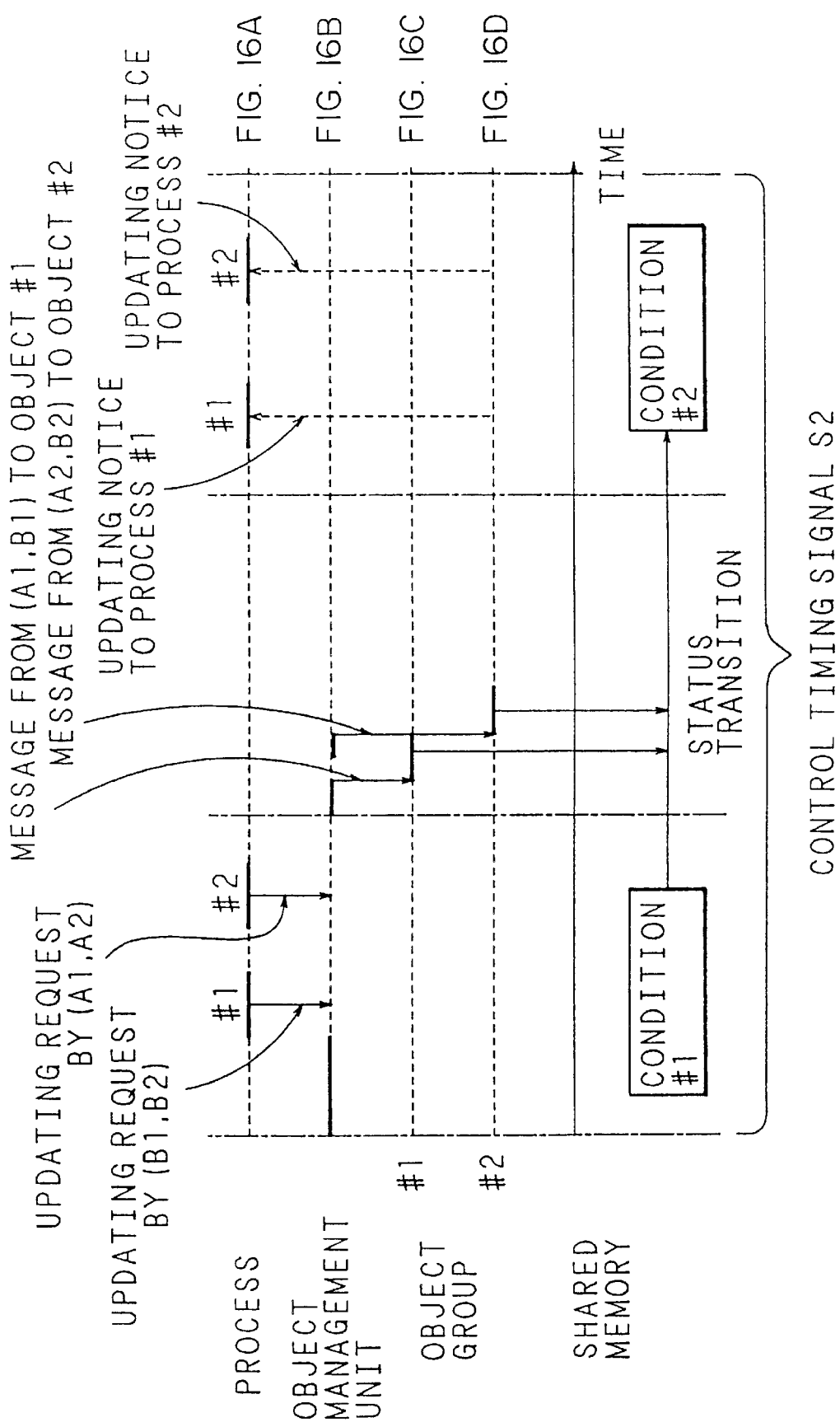

UPDATING AND REFERENCE MANAGEMENT SYSTEM AND REFERENCE TIMING CONTROL SYSTEM OF SHARED MEMORY

BACKGROUND OF THE INVENTION

1. Field of the Invention

The present invention relates to an updating and reference management system of a shared memory in which an updating request or a reference request for the shared memory from a process or an object in the process is executed after delaying, and relates to a reference timing control system in which a reference timing for the shared memory is controlled. More specifically, it relates to the updating and reference management system of the shared memory in which, in case of using an area on the shared memory between the processes or the objects, by not immediately executing it at the time point when the updating request or reference request to the area is received, but executing it after delaying once, gives an apparent identical time concept to a plurality of processes or objects associated with the area, and the reference timing control system in which a reference opportunity of the shared memory by the plurality of processes or objects is suppressed to a minimum to reduce overheads.

In recent years, as a performance of a computer system becomes higher, an artificial creature constituted by autonomous object groups is considered, and the time control of the artificial creature is required for a world where the artificial creature lives. Now, a time of the artificial creature is generated when the artificial creatures are related to each other, such as starting conversation or grasping the same object. Thus, an object group related to these situations shares the time with each other. Hereupon, the time sharing means that it is necessary to equalize the time progress in respective objects, and therefore, circumstances of the objects must be apparently identical. In this case, data on the memory shared between the objects corresponds to the circumstances of the objects.

2. Description of the Related Art

FIG. 1A, FIG. 1B show schematic diagrams for explaining a conventional synchronous method by a communication and a lock. Conventionally, when works are executed in synchronism between the processes, either a method of synchronizing the process to process communication as shown in FIG. 1A, or a method of synchronizing by the lock as shown in FIG. 1B is mainly adopted. That is, in an example shown in FIG. 1A, "MESSAGE", specifically, "MESSAGE-RECEIVE" and "MESSAGE-SEND" are sent and received between a process A and a process B for coordinating operation by synchronizing therebetween. Also, in an example shown in FIG. 1B, by using "LOCK" via the shared memory, data is protected between the process A and process B to synchronize therebetween.

In the example shown in FIG. 1A, though it is effective for synchronizing in case of a one to one relationship with a specific object by definite procedures, it is not so effective in case of an object such as the artificial creature.

In the example shown in FIG. 1B, even when the data can be protected by using the lock, the identical time can not be shared between the objects.

Also, when the identical time can be shared between the processes, each process has to refer to the shared memory in the state of keeping the identical time concept. However, as the number of processes increases, an access overhead for the shared memory becomes larger, and thus there is the possibility that it becomes difficult to maintain the identical time concept.

FIG. 2 is a schematic diagram for explaining the conventional problems, which shows a transition of variables on the shared memory. The case of executing processings as shown by the process A and process B, for the variable x=0 and y=0 which are the initial state, is considered. In case of executing the processing by the procedure (1), since x=0, first the process A writes y=1 into the shared memory, and then, since y=1 (when it is not y=0), the process B writes x=1 into the shared memory. As a result, in case of (1), x=1 and y=1 are written into the shared memory.

Meanwhile, in case of executing the processing by the procedure (2), since x=0, first the process B writes x=2, and then, since x=2 (when it is not x=0), the process A writes y=2. As a result, in case of (2), x=2 and y=2 are written into the shared memory. As such, depending upon the process which is executed first and whose result is executed, the result written into the shared memory is different.

As the above-mentioned examples, such a problem was encountered that, in the state where a plurality of objects share the time, the variables on the shared memory are updated to different states depending upon the executing sequences of the objects. In such a situation, the time is not shared by the objects and respective processes have their own times.

SUMMARY OF THE INVENTION

It is an object of the present invention to provide an updating and reference management system of a shared memory by which identical time circumstances can be provided to the respective objects in the state where the time is shared by objects. Hereupon, to provide the identical time circumstances to the objects is to give the identical time concept to the content of data on the memory shared therebetween.

It is another object of the present invention to provide a reference timing control system of a shared memory by which an overhead of a memory access, at the time of referring to the content of the shared memory by the processes or objects can be reduced in case of identical time concept, is obtained by the content of data on the shared memory as mentioned above.

An updating and reference management system of a shared memory for managing updating requests and reference requests to the shared memory from processes or objects in processes, of a first aspect of the present invention comprising: a shared memory which is shared by the processes or the objects in the processes; an area management unit which divides the shared memory into a plurality of areas and manages updating requests and reference requests to each divided area; and a timing unit which generates, for the area management unit, an updating timing signal decided by an absolute time; wherein a process having an updating request is allocated with a predetermined area by the operation for obtaining a portion of the shared memory, and sends the updating request for the allocated area to the area management unit, and the area management unit receives and processes the sent updating request, but delays its execution by holding once, then executes the updating request, which has been held hitherto, at the time point when the next updating timing signal is given from the timing unit, then for the reference request from the other process, manages so as to be able to refer to any area of the shared memory at any time.

An updating and reference management system of a shared memory for managing updating requests and reference requests to the shared memory from processes or objects in processes, of a second aspect of the present invention comprising: a shared memory which is shared by the processes or the objects in the processes; an area management unit which divides the shared memory into a plurality of areas and manages updating requests and reference requests to each divided area; and a timing unit which generates, for the area management unit, an updating timing signal synchronizing with a processing of a predetermined object; wherein a process having an updating request is allocated with a predetermined area by the operation for obtaining a portion of the shared memory, and sends the updating request for the allocated area to the area management unit, and the area management unit receives and processes the sent updating request, but delays its execution by holding once, then executes the updating request, which has been held hitherto, at the time point when the next updating timing signal is given from the timing unit, then for the reference request from the other process, manages so as to be able to refer to any area of the shared memory at any time.

An updating and reference management system of a shared memory for managing updating requests and reference requests to the shared memory from processes or objects in processes, of a third aspect of the present invention comprising: a shared memory which is shared by the processes or the objects in the processes; an object group which arranges data on the shared memory; an object management unit which controls an operation of the object group and a message transmission to the object group; and a timing unit which generates, for the object management unit, a control timing signal decided by an absolute time; wherein a process having an updating request sends the updating request for updating data on the shared memory to the object management unit, and the object management unit delays an execution of the sent updating request by holding it as a message to the object which manages corresponding data, then transfers the message and control to each object at the time point when the next control timing signal is given from the timing unit and executes the message, and for the reference request to the shared memory from the other process, manages so as to be able to refer to any portion of the shared memory at any time.

An updating and reference management system of a shared memory for managing updating requests and reference requests to the shared memory from processes or objects in processes, of a fourth aspect of the present invention comprising: a shared memory which is shared by the processes or the objects in the processes; an object group which arranges data on the shared memory; an object management unit which controls an operation of the object group and a message transmission to the object group; and a timing unit which generates, for the object management unit, a control timing signal synchronizing with a processing of the object; wherein a process having an updating request sends the updating request for updating data on the shared memory to the object management unit, and the object management unit delays an execution of the sent updating request by holding it as message to the object which manages a corresponding data, then transfers the message and control to each object at the time point when the next control timing signal is given from the timing unit and executes the message, and for the reference request to the shared memory from the other process, manages so as to be able to refer to any portion of the shared memory at any time.

An updating and reference management system of a shared memory for managing updating requests and reference requests to the shared memory from processes or objects in processes, of a fifth aspect of the present invention comprising: a shared memory which is shared by the processes or the objects in the processes; an area management unit which divides the shared memory into a plurality of areas and manages updating requests and reference requests to each divided area; and a timing unit which generates, for the area management unit, a reference timing signal; wherein a process having an updating request sends the reference request for referring to the areas of the shared memory to the area management unit, and the area management unit receives and processes the sent updating request, but delays its execution by holding once, then executes the updating request, which has been held hitherto, at the time point when the next updating timing signal is given from the timing unit, then for the reference request from the other process, manages so as to be able to refer to any area of the shared memory at any time.

An updating and reference management system of a shared memory for managing updating requests and reference requests to the shared memory from processes or objects in processes, of a sixth aspect of the present invention comprising: a shared memory which is shared by the processes or the objects in the processes; an area management unit which divides the shared memory into a plurality of areas and manages each divided area by discriminating them between updating and reference; and a timing unit which generates, for the area management unit, a timing signal for copying the updating area onto the reference area; wherein a process having an updating request sends the reference request for referring to the areas of the shared memory to the area management unit, and the area management unit receives the sent reference request and immediately executes it.

A reference timing control system of a shared memory for managing updating requests and reference requests to the shared memory from processes or objects in processes, of a first aspect of the present invention comprising: a shared memory which is shared by the processes or the objects in the processes; an object group which arranges data on the shared memory; an object management unit which controls an operation of the object group and a message transmission to the object group; and a timing unit which generates, for the object management unit, a control timing signal decided by an absolute time; wherein a process having an updating request sends the updating request for updating data on the shared memory to the object management unit, and the object management unit delays an execution of the sent updating request by holding it as a message to the object which manages corresponding data, then transfers the message and control to each object at the time point when the next control timing signal is given from the timing unit and executes the message, the object group issues an updating notice indicating that the shared memory has been updated to the processes, when executing the message, and the processes refer to the shard memory only when the updating notice is given.

A reference timing control system of a shared memory for managing updating requests and reference requests to the shared memory from processes or objects in processes, of a second aspect of the present invention comprising: a shared memory which is shared by the processes or the objects in the processes; an object group which arranges data on the shared memory; an object management unit which controls an operation of the object group and a message transmission to the object group; and a timing unit which generates, for the object management unit, a control timing signal synchronizing with a processing of the object; wherein a process having an updating request sends the updating request for updating data on the shared memory to the object management unit, and the object management unit delays an execution of the sent updating request by holding it as message to the object which manages a corresponding data, then transfers the message and control to each object at the time point when the next control timing signal is given from the timing unit and executes the message, the object group issues an updating notice indicating that the shared memory has been updated to the processes, when executing the message, and the processes refer to the shard memory only when the updating notice is given.

The above and further objects and features of the invention will more fully be apparent from the following detailed description with accompanying drawings.

BRIEF DESCRIPTION OF THE DRAWINGS

FIG. 1A and FIG. 1B are schematic diagrams for explaining a conventional synchronizing method by a communication and a lock, respectively;

FIG. 13 is a schematic diagram for explaining a method of obtaining a data area on a shared memory and registering an object for managing the same, according to an updating and reference management system of a shared memory of the present invention;

FIGS. 16A through 16D are charts for explaining a reference timing control system of a shared memory of the present invention.

DESCRIPTION OF THE PREFERRED EMBODIMENTS

In the following, preferred embodiments of the present invention are described. First, an updating and reference management system of a shared memory of the present invention is described.

Figure 2:
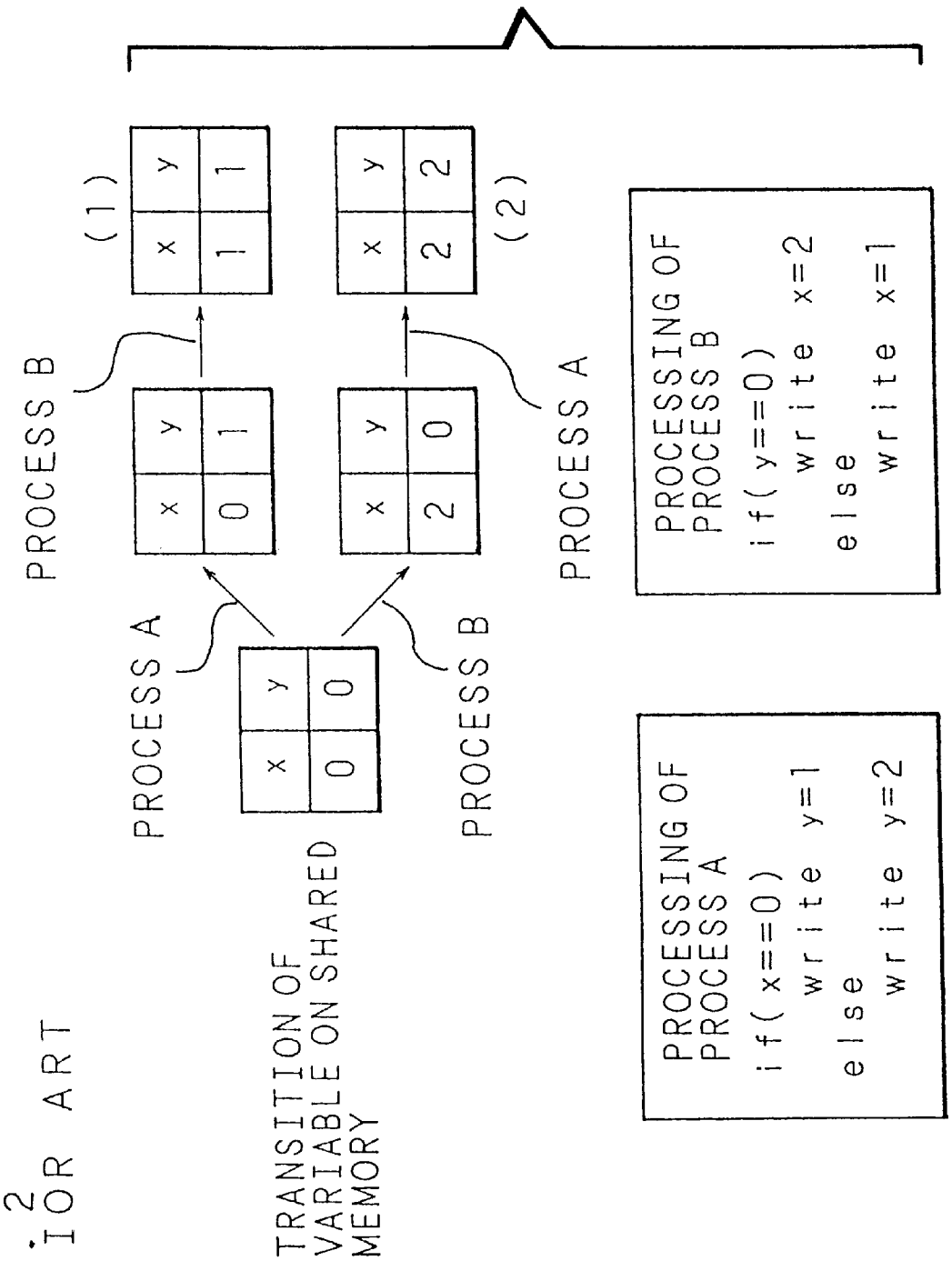
FIG. 2 is a schematic diagram for explaining problems of the prior art.
Figure 3:
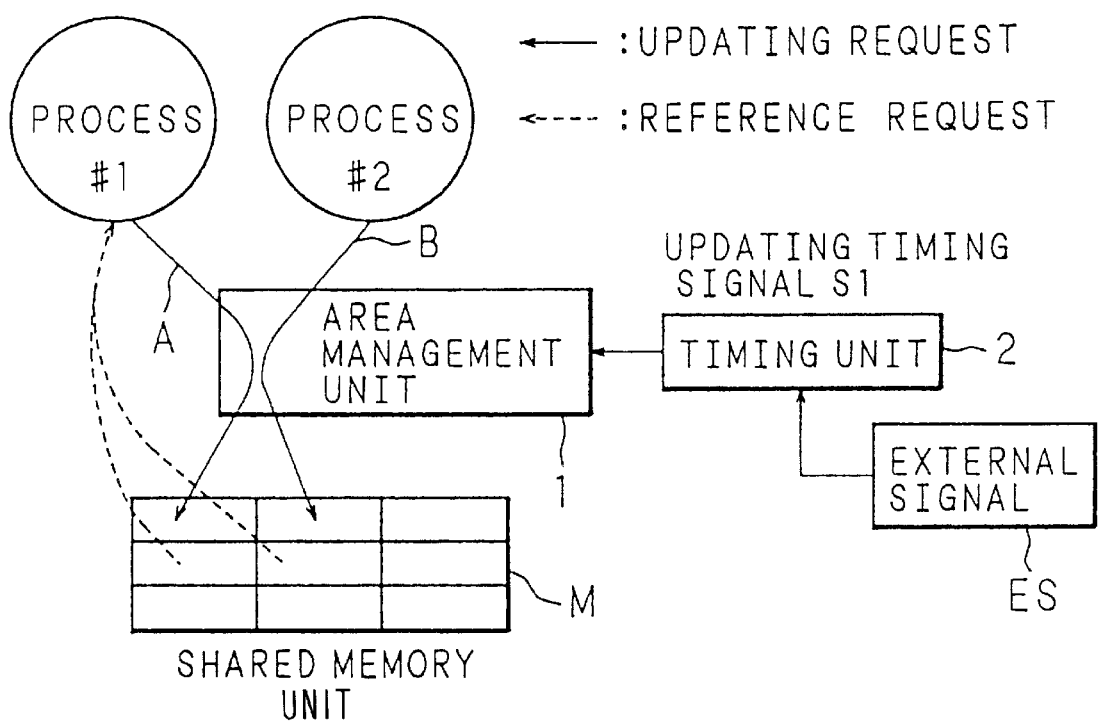
FIG. 3 is a schematic block diagram showing an essential configuration of a first aspect and a second aspect of an updating and reference management system of a shared memory of the present invention.
Figure 4:
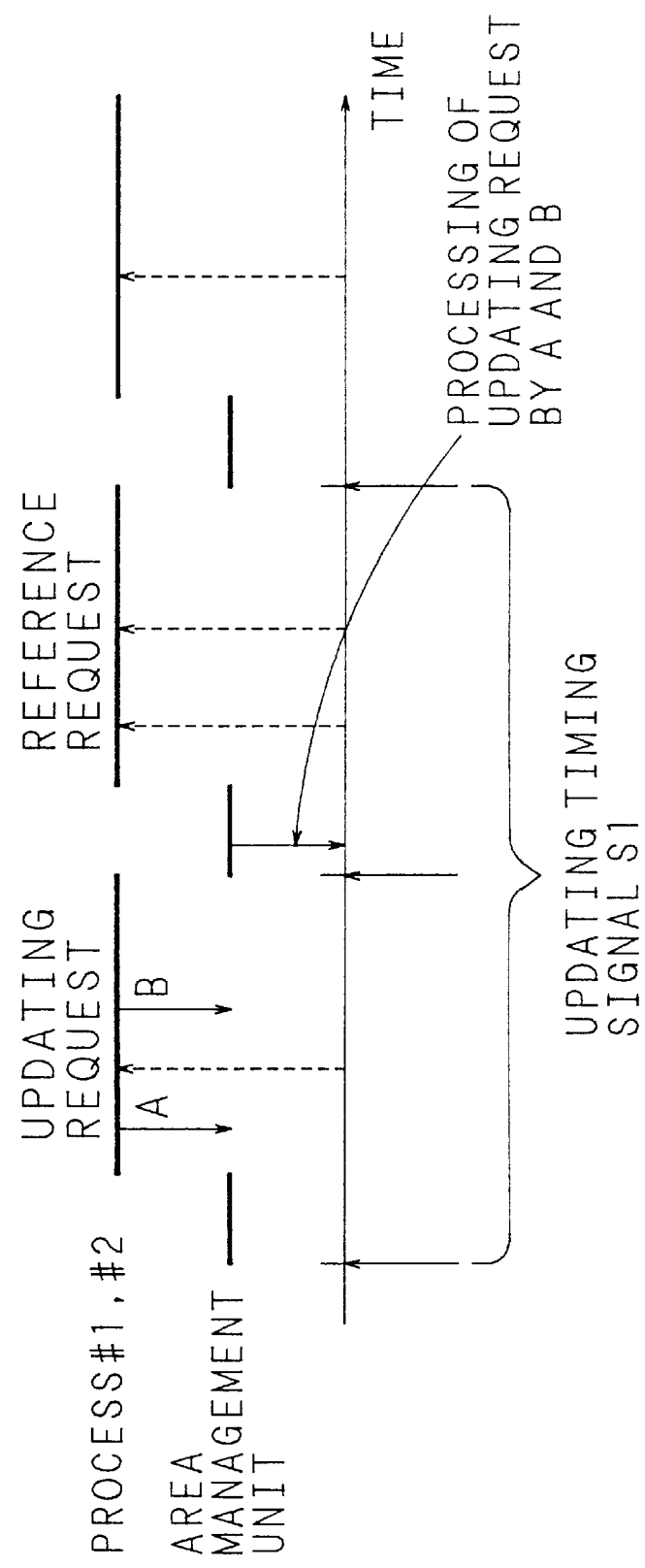
FIG. 4 is a chart for explaining an operation of a first aspect and a second aspect of an updating and reference management system of a shared memory of the present invention.

FIG. 3 is a schematic block diagram showing an essential configuration of a first aspect and a second aspect of an updating and reference management system of a shared memory of the present invention, and FIG. 4 is a chart for explaining the operation thereof. In the figure, a process #1 and a process #2 indicate processing units (control units) which generate an updating request and a reference request to a shared memory M, and read data from the shared memory M so as to update the contents of the shared memory M again responsive to the result.

In the first aspect of the present invention, an area management unit 1 manages each area of the shared memory M for every process, and receives the updating request to the shared memory M issued by a process, but holds the execution of it. Thereafter, at the timing of receiving an updating timing signal S1 outputted from a timing unit 2, the area management unit 1 executes the updating request which is held hitherto. The timing unit 2 sends the updating timing signal S1 to the area management unit 1 at a time interval decided by an absolute time.

Meanwhile, in the second aspect, the timing unit 2 receives a predetermined external signal ES given from the outside and uses it, and not the absolute time, as the updating timing signal S1.

The shared memory M is a memory unit which usually reads/writes directly from the processes sharing the memory. However, though data can be read out (refer) directly by management of the area management unit 1, the writing (updating) is executed via the area management unit 1.

Each process obtains a shared memory area which can be updated by itself from the area management unit 1, and issues the updating requests A and B to the obtained area. This request can be made at any time during the operation of the process. However, since this request is first received by the area management unit 1 and processed, its execution is held and never executed at real time. Thereafter, when the updating timing signal S1 is given from the timing unit 2 which measures an interval of the updating timing signal, the area management unit 1 executes the updating request held at present. The reference request to the shared memory M is executed at real time.

In case of realizing the first aspect and the second aspect of the present invention in such a manner, the processes #1 and #2 tick the time synchronizing with the updating timing signal S1, and thus each interval of the updating timing signals S1 can be shared as an identical time.

Figure 5:
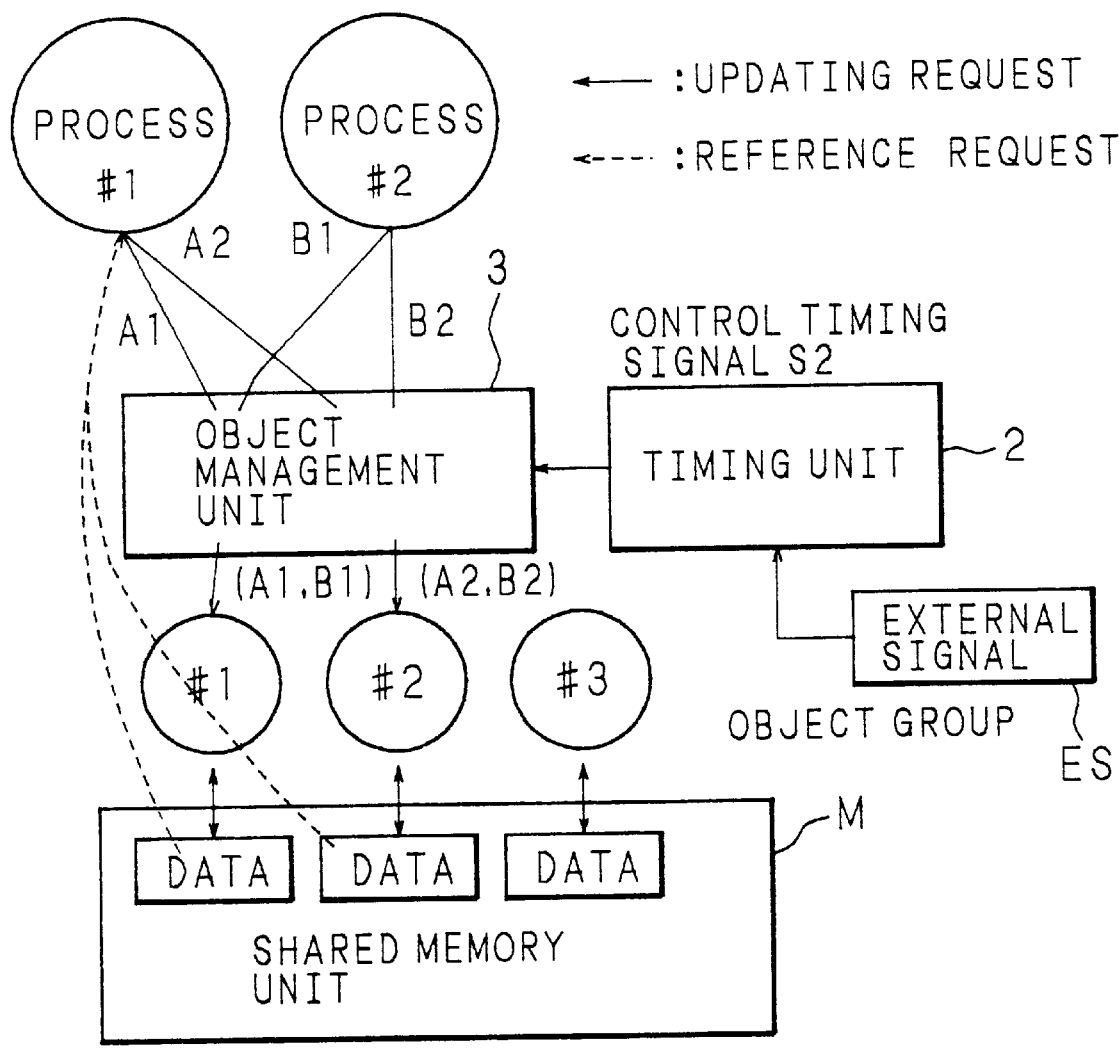
FIG. 5 is a schematic block diagram showing an essential configuration of a third aspect and a fourth aspect of an updating and reference management system of a shared memory of the present invention.
Figure 6:
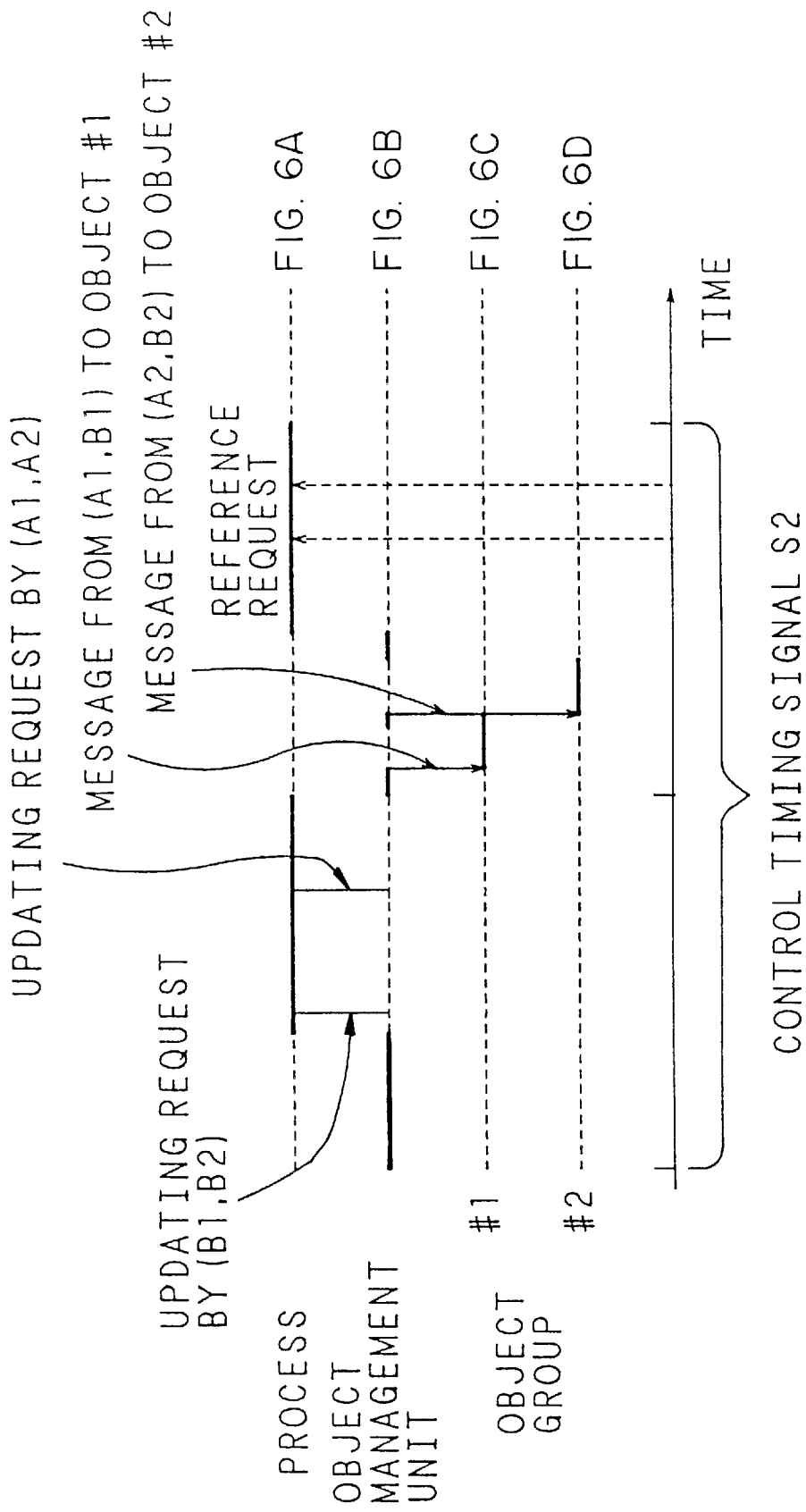
FIGS. 6A through 6D are charts for explaining an operation of a third aspect and a fourth aspect of an updating and reference management system of a shared memory of the present invention.

FIG. 5 is a schematic block diagram showing an essential configuration of a third aspect and a fourth aspect of an updating and reference management system of a shared memory of the present invention, and FIGS. 6A through 6D are charts for explaining the operation thereof. In the third aspect, an object management unit 3 manages data of the shared memory M and an object group which manages the shared memory M, and receives the updating request to the shared memory M issued by the process and processes it, but holds its execution once. Thereafter, the object management unit 3 sends the updating request, which has been held hitherto, to the object which manages the data at the time point when a control timing signal S2 is given from the timing unit 2 and executes the object. Also, the timing unit 2 sends the control timing signal S2 to the object management unit 3 at a time interval decided by an absolute time.

Meanwhile, in the fourth aspect, the timing unit 2 generates the control timing signal S2, not by the absolute time, but by the external signal ES given from the outside.

The object group manages data arranged in the shared memory M. The data arranged in the shared memory M are managed by the corresponding object of the object group. That is, for the data arranged in the shared memory M, the updating request is executed through the object respectively corresponding thereto. However, the object must be able to process contradictory requests from the different processes. For example, in case of receiving the updating request of different values for the identical memory variable, the updating request can be executed by either of the different values or by the completely different other value, by judgment of the object which manages the memory variable.

In case of updating optional data in the shared memory M by the processes, the updating request is issued to the object which manages the data to be updated. Thereby, the data can be requested to update at any time during the operation of the processes. However, though the request is received by the object management unit 3 and processes, its execution is held once and never executed at real time. The object management unit 3, at the time point when the control timing signal S2 is given from the timing unit 2 which measures an interval of the control timing signal, sends the updating request, whose execution is held at present, to the corresponding object for execution. Meanwhile, the reference to the shared memory M is executed at real time. In case of realizing the third aspect and the fourth aspect of the present invention in such a manner, the processes #1 and #2 can share each interval of the control timing signals S2 as the identical time by ticking the time by the control timing signal S2.

Figure 7:
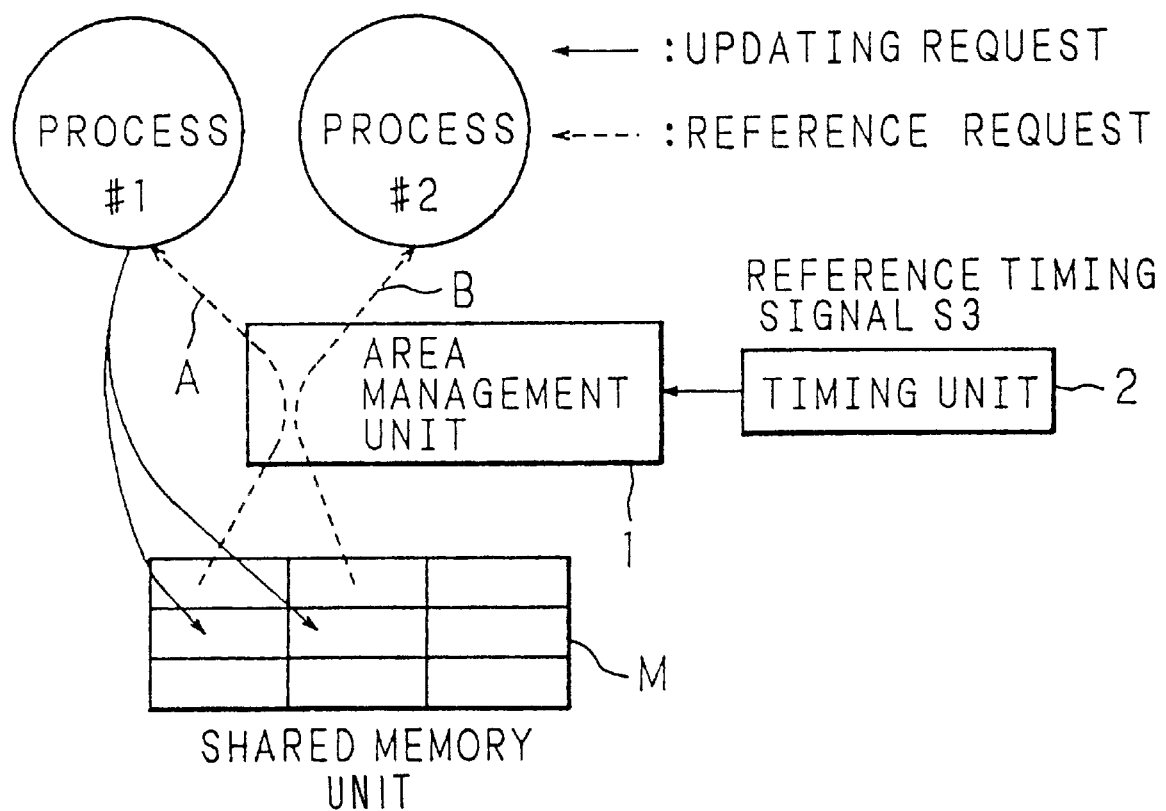
FIG. 7 is a schematic block diagram showing an essential configuration of a fifth aspect of an updating and reference management system of a shared memory of the present invention.
Figure 8:
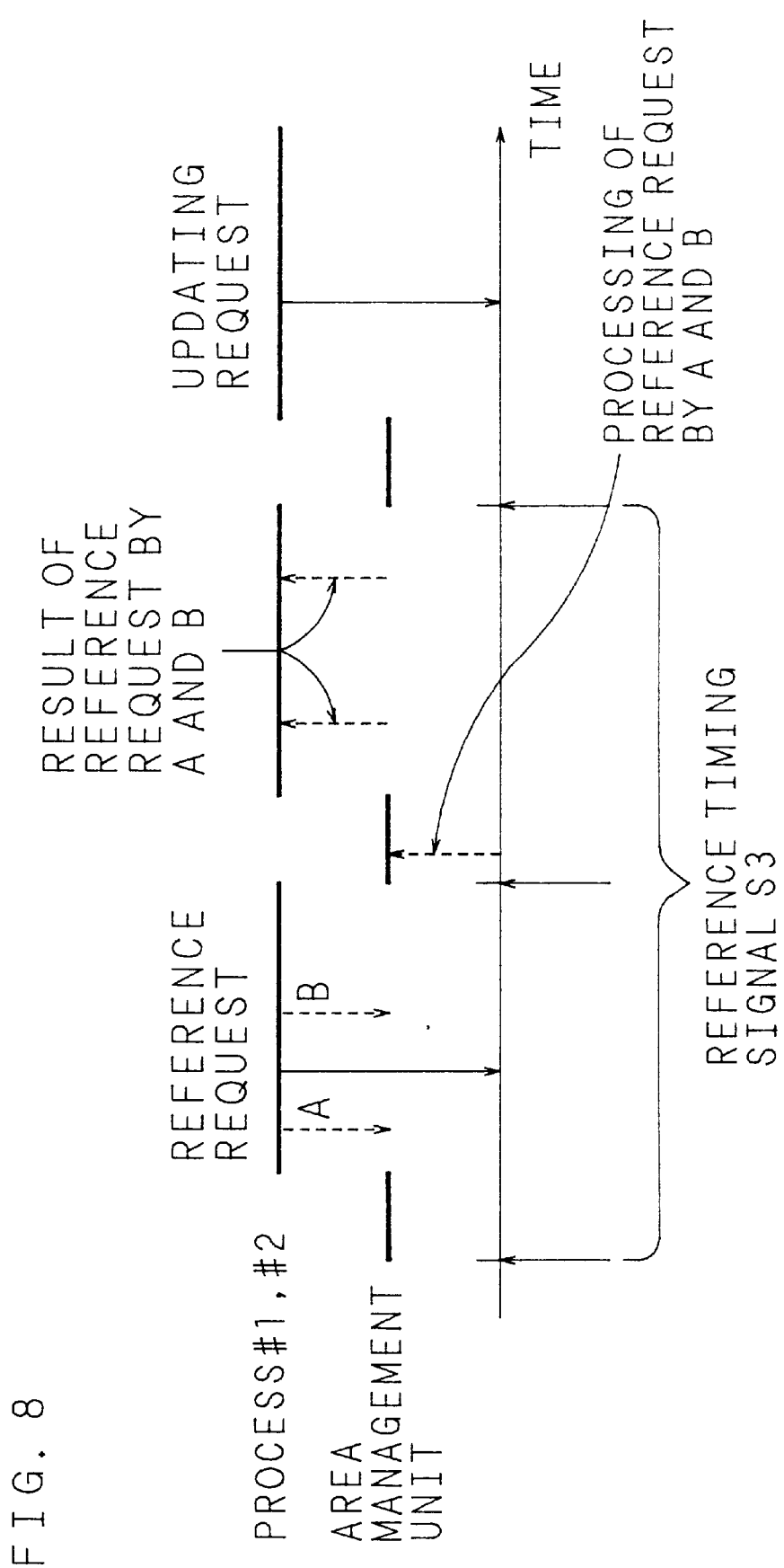
FIG. 8 is a chart for explaining an operation of a fifth aspect of an updating and reference management system of a shared memory of the present invention.

FIG. 7 is a schematic block diagram showing an essential configuration of a fifth aspect of an updating and reference management system of a shared memory of the present invention, and FIG. 8 is a chart for explaining the operation thereof. In the fifth aspect, the area management unit 1 manages the area of the shared memory M for every process, and receives the reference request issued to the shared memory M from the process and processes it, but holds its execution once. The area management unit 1 executes the reference request at the time point when a reference timing signal S3 is received from the timing unit 2. The timing unit 2 sends the reference timing signal S3 to the area management unit 1. Though the writing (updating) is possible for the shared memory M by management of the area management unit 1, the reading (reference) is executed after being held once in the area management unit 1.

Each process obtains the shared memory area, which can be updated by itself, from the area management unit 1, and issues the updating request to the obtained area. This request can be issued at any time during the operation of the processes. The updating to the shared memory M is executed at real time. Meanwhile, though the reference request issued by each process is received by the area management unit 1 and processes, its execution is held once and never executed at real time. The area management unit 1 executes the reference request, whose execution is held at present, at the time point when the reference timing signal S3 is received from the timing unit 2 which measures an interval of the reference timing signal S3. In case of realizing the fifth aspect of the present invention in such a manner, the processes #1 and #2 can share each interval of the reference timing signal S3 as the identical time, by ticking the time by the reference timing signal S3.

Figure 9:
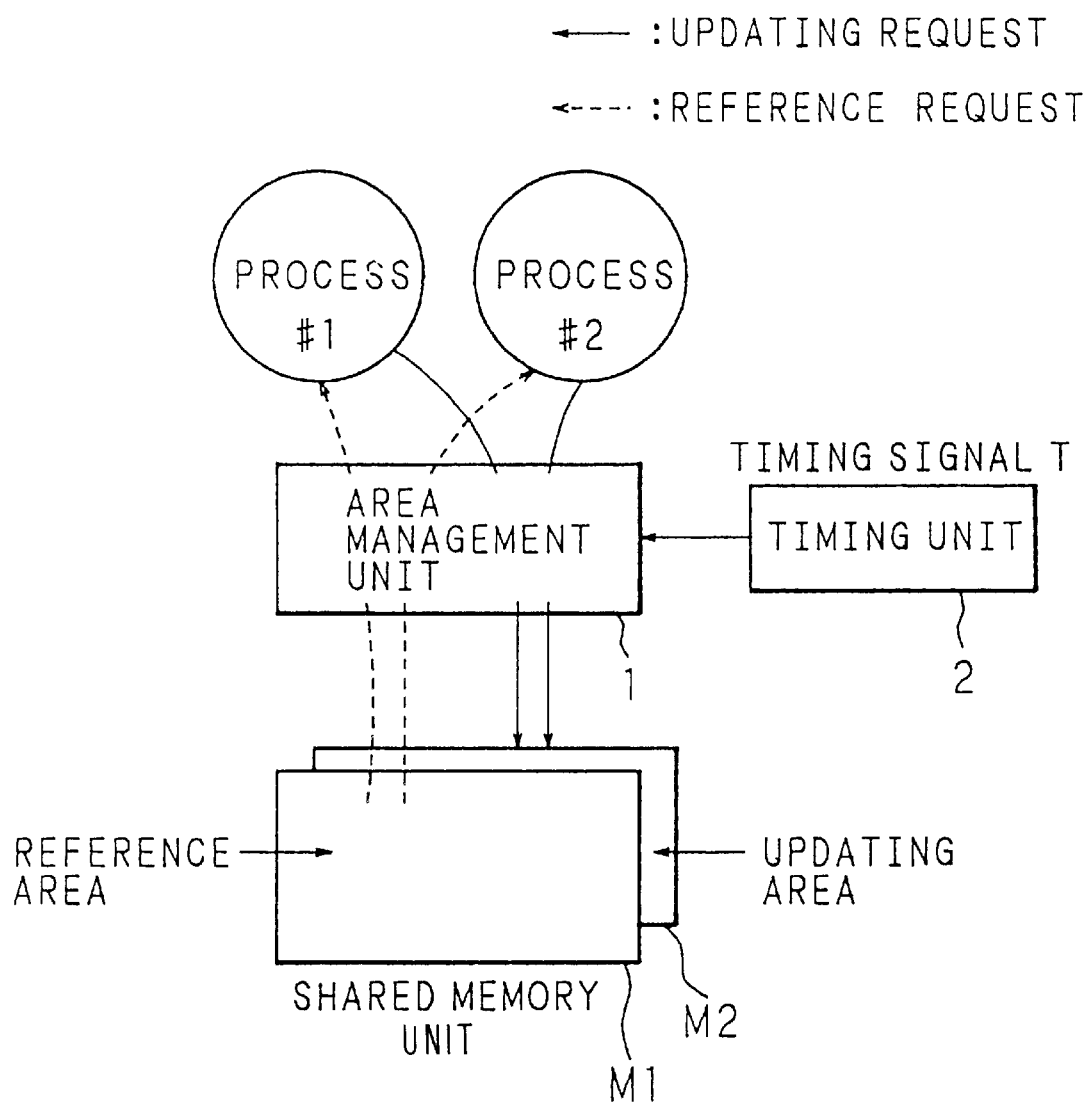
FIG. 9 is a schematic block diagram showing an essential configuration of a sixth aspect of an updating and reference management system of a shared memory of the present invention.
Figure 10:
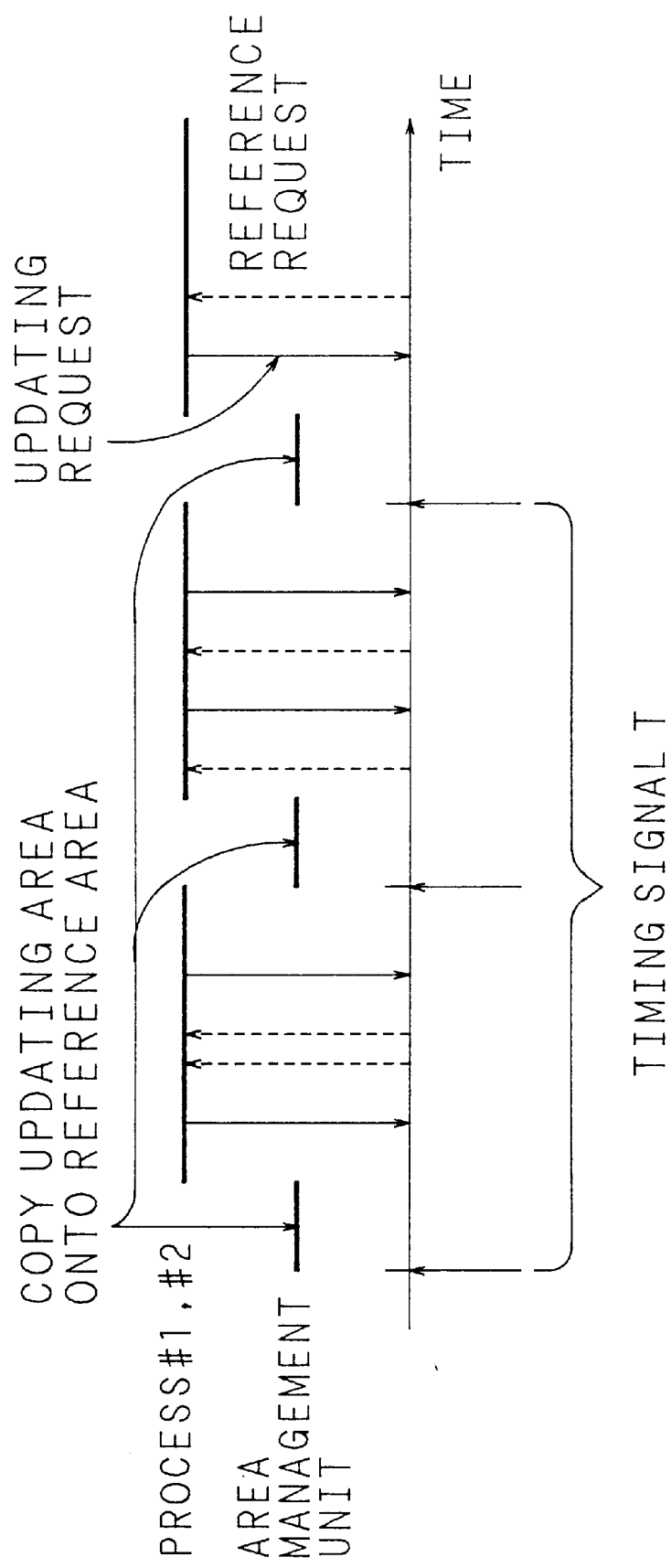
FIG. 10 is a chart for explaining an operation of a sixth aspect of an updating and reference management system of a shared memory of the present invention.

FIG. 9 is a schematic block diagram showing an essential configuration of a sixth aspect of an updating and reference management system of a shared memory of the present invention, and FIG. 10 is a chart explaining the operation thereof. In the sixth aspect, the area management unit 1 manages the shared memory area for every process, and receives the reference request and updating request to the shared memory M issued by the process and processes them. But the area management unit 1, for the reference request, uses a reference area M1 of the shared memory M and executes it, and for the updating request, uses an updating area M2 of the shared memory M and executes it. Then, at the time point when a timing signal T is received from the timing unit 2, the updating area M2 is copied onto the reference area M1. The timing unit 2 issues the timing signal T to the area management unit 1. As described above, the shared memory M is managed separately, the reference area M1 and the updating area M2. However, from the processes, these areas are never minded but regarded as one area.

Each process obtains the area of the shared area M which can be updated by itself from the area management unit 1, and gives an identifier (ID) to the obtained area to issue the updating request (the updating request is made in the form of the ID, an offset and its data) to the area. This request is received and processed at the area management unit 1 in such a manner that, first, a base address of an updated area is obtained from the updating request and the ID, and the required offset is added to the address to obtain an actual address. The updating request is executed for this address. The updating request can be made at any time during the operation of the processes. The updating request to the shared memory M is executed at real time. The reference request (requested by the ID and its offset and size) issued by each process is received and processed by the area management unit 1, and an address in a reference area is obtained by using the same address calculation method as the updating request to execute the reference request.

The area management unit 1 copies the updating area M2 onto the reference area M1, at the time point when the timing signal T is received from the timing unit 2 which measures the timing. In such a manner, the processes #1 and #2 can share each interval of the timing signals T as the identical time by ticking the time by the timing signal T.

Figure 11:
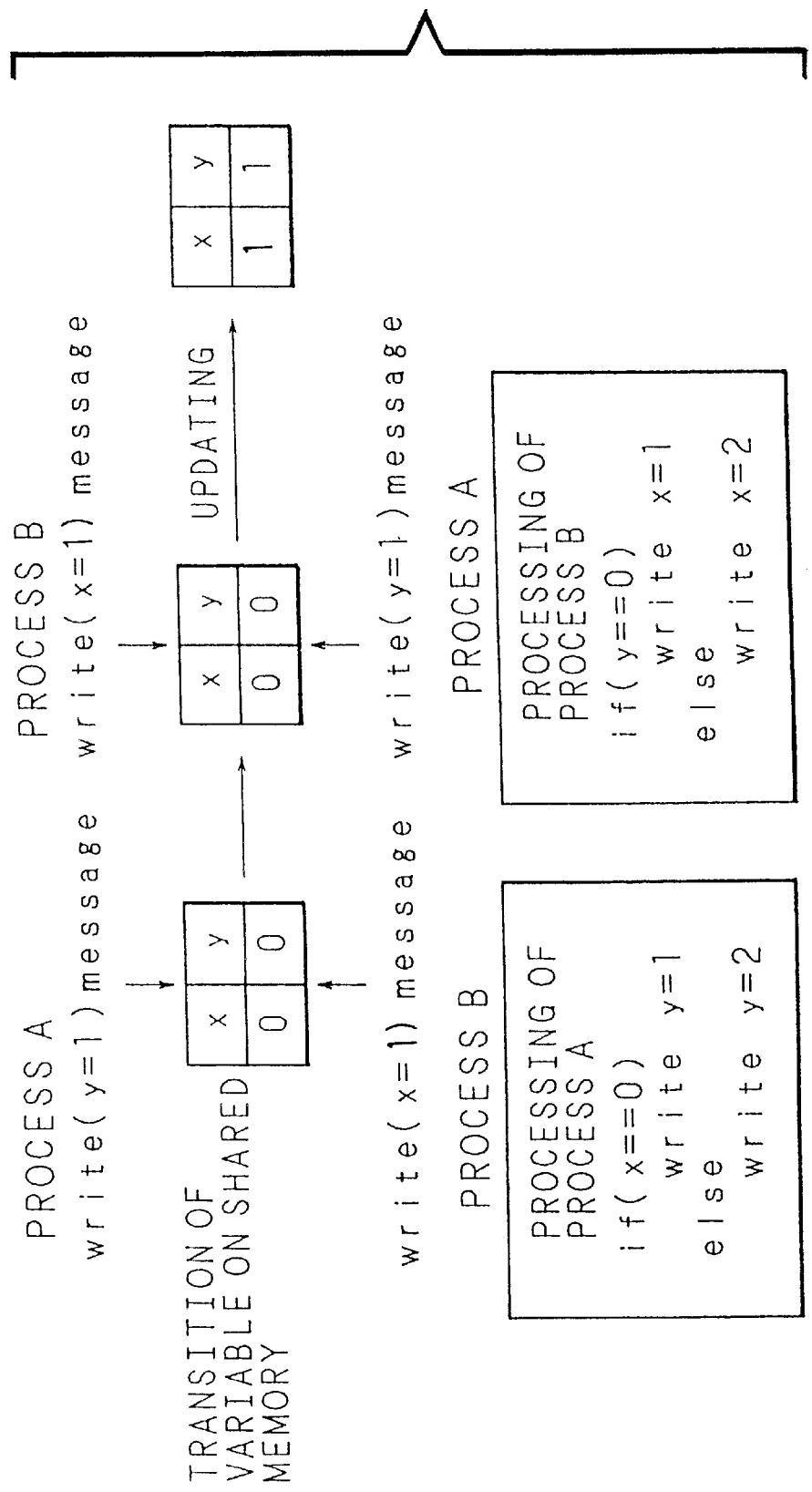
FIG. 11 is a schematic diagram showing a concept for sharing an identical time between processes, according to an updating and reference management system of a shared memory of the present invention.

FIG. 11 is a schematic diagram showing a concept for sharing the identical time between processes according to the present invention. As previously discussed, in the first and the second aspect, as shown in FIG. 4, the timing unit 2 measures the updating timing, and in a state set beforehand, for example, at the time point when the set time is reached, sends the updating timing signal S1 to the area management unit 1. The area management unit 1 receives the updating request issued from the process, and holds till receiving the updating timing signal S1 from the timing unit 2, then executes it at the time point when receiving the updating timing signal S1. Thereby, even when the updating request to the shared memory M from the process is issued, it is never executed at real time.

In an example shown in FIG. 11, when variables on the shared memory M are x=0 and y=0, by updating simultaneously by using a write "MESSAGE" of a process A and a write "MESSAGE" of a process B, x=1 and y=1 is established. Thus, the process A and the process B refer to the variables on the shared memory M of the identical time, thereby the two processes can share the identical time. This means that the two processes shared the identical time because the same result is obtained even when replacing executing sequences of the two processes within the identical time.

Figure 12:
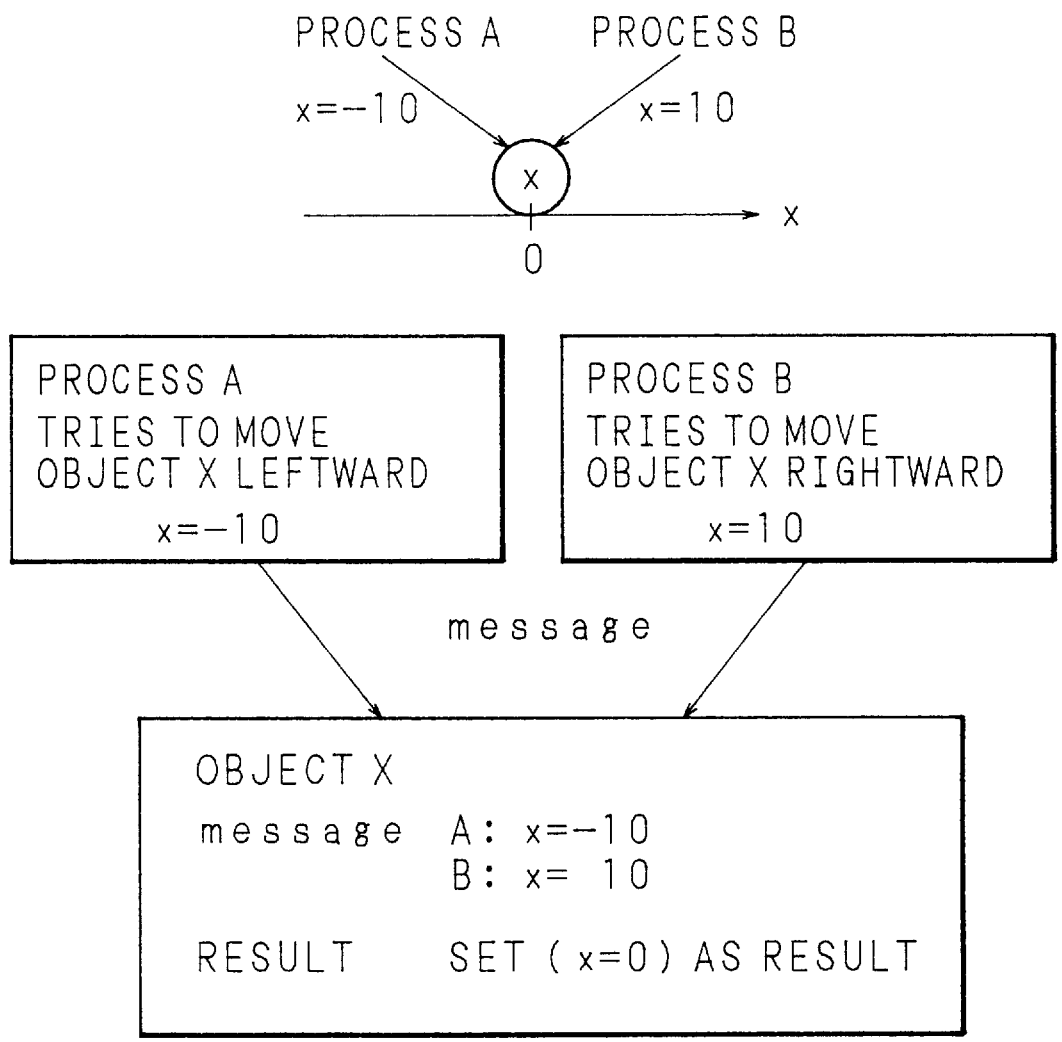
FIG. 12 is a schematic diagram for explaining procedures when two processes update an identical memory variable, according to an updating and reference management system of a shared memory of the present invention.

FIG. 12 is a schematic diagram for explaining processing procedures when two processes update an identical memory variable according to the present invention. In the aforementioned first aspect and second aspect, it is effective only in the case where the memory variable on the shared memory M is managed exclusively by each process. This is apparent when considering the case wherein the different processes request the different values to the identical memory variable on the shared memory M within the identical time. In this case, it is impossible to determine to which value the memory variable on the shared memory M is to be updated, causing a contradiction.

Hence, in the third aspect and the fourth aspect, the updating request of the different values to the identical memory is arranged so as to be processes, by using the object group which manages data of the shared memory M. Also, by providing the object management unit 3 for processing the updating request to the object group, the identical time can be shared between the processes.

FIG. 12 shows the case where position ordinates of an object X is to be updated by the different values within the identical time by the two processes A and B, but the practical updating is managed by the object X. That is, the process A tries to move the object X leftward (x=−10), and the process B tries to move the object X rightward (x=10). By these "MESSAGE", the object X does not have to move as a result, and the practical updating seems to be managed by the object X.

As previously described, against the first through fourth aspects wherein the execution of the updating request itself is delayed, in the fifth aspect, though the updating request is executed at real time, the reference request is held by the area management unit 1 and executed at the time point when the timing signal is received.

Also, as previously described, in the first aspect to the fifth aspect, either the updating request or the reference request is processed, and executed at the time point when a predetermined signal is given from the timing unit 2. However, in the sixth aspect, execution of the request is not held but executed at real time, and the time sharing between the processes is realized. However, it is different in that, the shared memory is separated into the updating area and the reference area, which are controlled by the timing signal from the timing unit 2.

FIG. 13 is a schematic diagram for explaining a method of obtaining a data area on a shared memory M and registering an object for managing the same, according to the present invention. The object which places data on the shared memory M uses a function "OBJECT-ENTER ()" for obtaining the data area and registering the object. This function is that, after obtaining the data area on the shared memory M, its address is registered on a management table as shown in FIG. 13. A process for accessing the registered area is that, by accessing at a following format "DATA-PUT (ADDRESS, SIZE, DATA)", the request can be processed and given to the object which manages the registered area.

Figure 14:
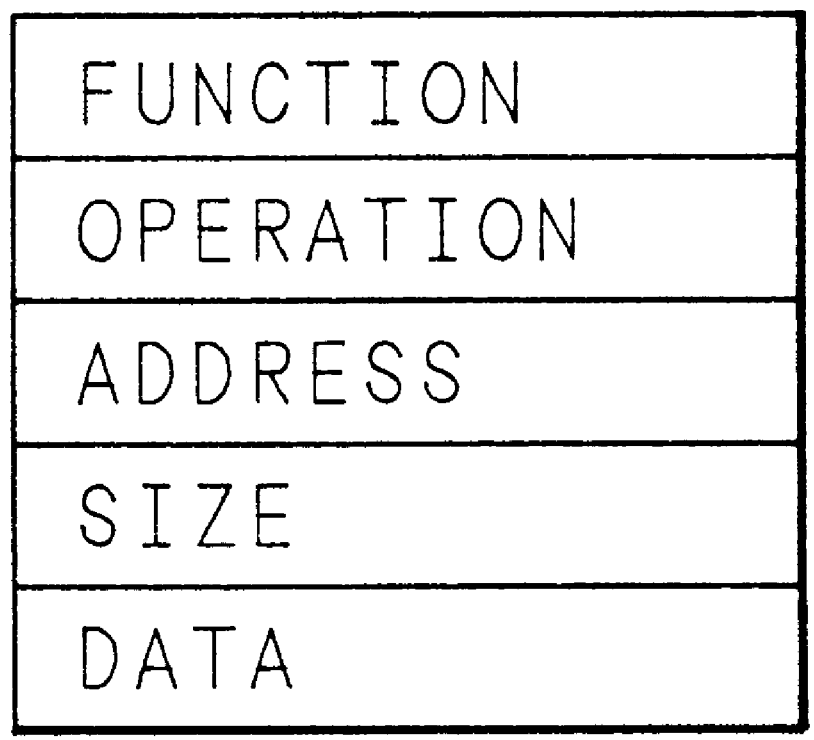
FIG. 14 is an explanatory diagram of a storage type of messages held by an area management unit, according to an updating and reference management system of a shared memory of the present invention.

FIG. 14 is a schematic diagram for explaining a storage type of messages held by the area management unit 1, according to the present invention. For example, when the request is "DATA-PUT (ADDRESS, SIZE, DATA)", though the "ADDRESS" indicates an address in the shared memory M, and the "SIZE" also indicates the size, at this time, a data size indicated by "DATA" is also shown, and when the designated address and size contradict with that on the table, it also returns the error.

The area management unit 1 processes the request to be accessed in the above-mentioned form, and holds in the form of messages as shown in FIG. 14. An operation field shown in FIG. 14 is an area for storing a flag indicating either the updating request or the reference request.

Figure 15:
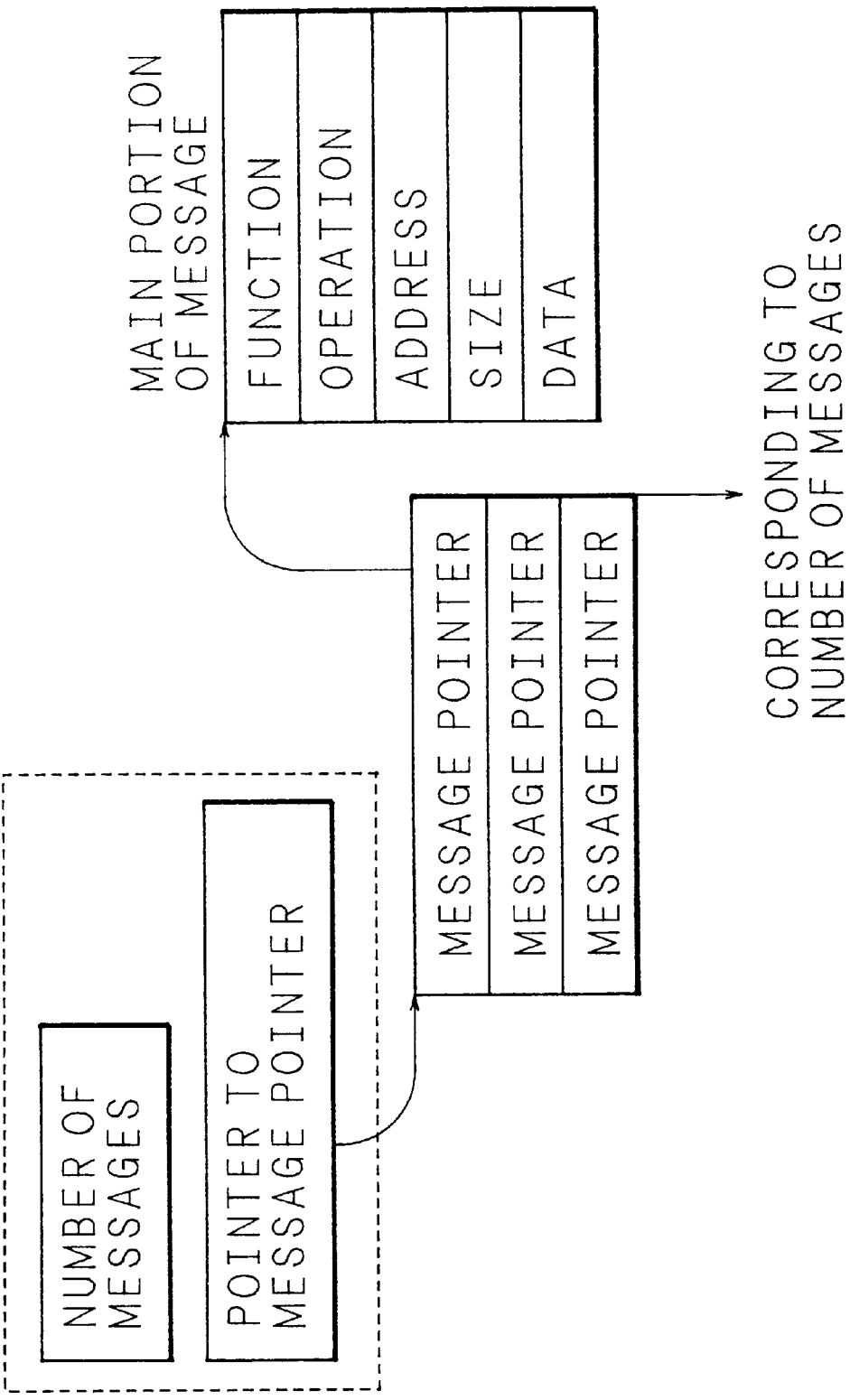
FIG. 15 is a schematic diagram for explaining a configuration of a parameter given to an object, according to an updating and reference management system of a shared memory of the present invention.

FIG. 15 is a schematic diagram for explaining a configuration of a parameter given to an object, according to the present invention. Though the area management unit 1 holds execution of the received request till receiving the signal from the timing unit 2. When the timing unit 2 measures the designated time and sends a signal indicating that the designated time comes to the area management unit 1, the area management unit 1 gives the message to the designated function at this timing. At this time, the message is not given one by one, but is given in a sum as shown in a list structure. Thereby, the object can process a plurality of messages as occurring at the same time.

Furthermore, as another embodiment, when the process tries to update data on the shared memory M, knowing the object which manages the data to be updated, the process may update the data by using the accessing method provided by the object. In this case, for example, the object is held as the message for the accessing method, and the object which receives the request executes processing by using the size and data.

As still another embodiment, though the timing unit 2 generates the signal according to the measurement by a timer in the above-mentioned embodiment, for example, interruption timing by hardwares may be used, or a signal from the object managing a certain time system may be used. The object which manages the time system is present between any processes to manage the timing between the processes. In case of using such an object, not only a global time control or the time control on the identical time system of the whole processes, but the time system between the individual processes can be controlled.

Next, a reference timing control system of a shared memory of the present invention is described.

Even when the identical time concept is obtained in the content of data on the shared memory M, when an overhead of the memory access becomes larger in case of referring to the content of the shared memory M by a plurality of processes or the objects, there is the possibility that the identical time concept is collapsed from this point. Thus, a number of references (memory access) must be suppressed to the minimum to reduce the overhead, by eliminating the useless reference request to the shared memory M by the plurality of processes or objects. Hence, in the reference timing control system of the shared memory of the present invention, only when it is necessary to refer to the shared memory M, viewing from the process or object side, is the fact noticed to the process or object.

This is realized in the aforementioned third aspect and fourth aspect in such a manner that, when there is the change in its necessary data which has to be referred to by all means for the process or object, an updating notice indicating that the content of the shared memory M is updated, is issued to the process or object from the object group which manages the data of the shared memory M, and only when receiving this updating notice, the process or object executes read access (reference) to the shared memory M.

Meanwhile, the updating notice is that, when there is the change in a state of the shared memory M before the updating notice, in other words, when a message of the updating request to the shared memory M is given to the object which manages data of the shared memory M from the area management unit 1, the object issues the updating notice to the process or object at a predetermined timing.

FIGS. 16A through 16D are charts for explaining a reference timing control system of a shared memory of the present invention, wherein a state of the memory content and a timing of issuing the updating notice to the process are added to aforementioned FIGS. 6A through 6D.

FIGS. 16A through 16D, by giving the message of the updating request to the object which manages the data from the object management unit 3, at the time point when the control timing signal S2 is given to the area management unit 1 when the content of the shared memory M is in a state #1 which is the same as FIGS. 6A through 6D, the updating request is executed and the content of the shared memory M changes to a state #2. Then, the object for managing data to which the updating request is given from the object management unit 3 issues the updating notice to the processes at the time point when the content of the shared memory M is updated. Thereby, each process, since the updating notice is given only when the content of the shared memory M is updated, may refer to the shared memory M only in that case. Thus, a memory access overhead for the shared memory M is reduced.

As particularly described heretofore, according to the updating and reference management system of the shared memory of the present invention, the identical time can be shared between the processes, and within the identical time, the shared memory can be operated independently from execution sequences of the process, and thereby, not only a sequential execution type programming model processed by a conventional method by controls using a process-to-process communication and lock can be realized, but also circumstances of a parallel execution type programming which are the circumstances suitable for a world of autonomous objects can be realized, contributing largely to the development of an autonomous object architecture.

The sequential execution type is defined as, for example, executing the process A and then executing the process B by using the result of the process A. When the result is independent from the execution sequences of the processes A and B, the execution can be performed in parallel.

Furthermore, according to the reference timing control system of the shared memory of the present invention, since the updating notice is issued to the process only when there is the change in the data content of the shared memory, and each process may execute read access to the shared memory only when receiving the updating notice, the memory access overhead for the shared memory is reduced.

As this invention may be embodied in several forms without departing from the spirit of essential characteristics thereof, the present embodiment is therefore illustrative and not restrictive, since the scope of the invention is defined by the appended claims, and all changes that fall within meets and bounds of the claims, or equivalents of such meets and bounds thereof are therefore intended to be embraced by the claims.

What is claimed is:

1. An updating and reference management system of a shared memory for managing updating requests and reference requests to the shared memory from processes or objects in processes, said system comprising:

an area management unit which divides said shared memory into a plurality of areas and manages the updating requests and the reference requests to each divided area; and a timing unit which generates, for said area management unit, an updating timing signal based on a real time;

wherein one of the processes having an updating request is allocated with a predetermined area by an operation for obtaining a portion of said shared memory, and sends the updating request for the allocated area to said area management unit, wherein said area management unit receives and processes the sent updating request, but delays its execution during a timing interval defined by the updating timing signal, then executes the updating request at the time when the updating timing signal is given from said timing unit, the reference requests from the processes are processed immediately throughout the timing interval, and wherein an identical time circumstance is provided at any of the objects in the processes sharing time, and an overhead memory access is reduced when the shared memory is referred to by the processes or objects.

2. An updating and reference management system of a shared memory for managing updating requests and reference requests to the shared memory from processes or objects in processes, said system comprising:

an area management unit which divides said shared memory into a plurality of areas and manages the updating requests and the reference requests to each divided area; and a timing unit which generates, for said area management unit, an updating timing signal synchronized with a processing of a predetermined object;

wherein one of the processes having an updating request is allocated with a predetermined area by an operation for obtaining a portion of said shared memory, and sends the updating request for the allocated area to said area management unit, wherein said area management unit receives and processes the sent updating request, but delays its execution during a timing interval defined by the updating timing signal, then executes the updating request at the time when the updating timing signal is given from said timing unit, the reference requests from the processes are processed immediately throughout the timing interval, and wherein an identical time circumstance is provided at any of the objects in the processes sharing time, and an overhead memory access is reduced when the shared memory is referred to by the processes or objects.

3. An updating and reference management system of a shared memory for managing updating requests and reference requests to the shared memory from processes or objects in processes, said system comprising:

an object group which arranges data on said shared memory;

an object management unit which controls an operation of said object group and a message transmission to said object group; and a timing unit which generates, for said object management unit, a control timing signal based on a real time;

wherein one of the processes having an updating request sends the updating request for updating data in said shared memory to said object management unit, wherein said object management unit delays an execution of the sent updating request by holding the sent updating request for a timing interval defined by the control timing signal as a message to the object which manages data corresponding to the sent updating request, then transfers the message and control to each object at the time when the control timing signal is given from said timing unit and executes the message, and the reference requests to the shared memory from the processes are processed immediately throughout the timing interval, and wherein an identical time circumstance is provided to any of the objects in the processes sharing time, and an overhead memory access is reduced when the shared memory is referred to by the processes or objects.

4. An updating and reference management system of a shared memory for managing updating requests and reference requests to the shared memory from processes or objects in processes, said system comprising:

an object group which arranges data on said shared memory;

an object management unit which controls an operation of said object group and a message transmission to said object group; and a timing unit which generates, for said object management unit, a control timing signal synchronized with a processing of the object group;

wherein one of the processes having an updating request sends the updating request for updating data in said shared memory to said object management unit, wherein said object management unit delays an execution of the sent updating request by holding the sent updating request for a timing interval defined by the control timing signal as a message to the object which manages data corresponding to the sent updating request, then transfers the message and control to each object at the time when the control timing signal is given from said timing unit and executes the message, and the reference requests to the shared memory from the processes are processed immediately throughout the timing interval, and wherein an identical time circumstance is provided to any of the objects in the processes sharing time, and an overhead memory access is reduced when the shared memory is referred to by the processes or objects.

5. An updating and reference management system of a shared memory for managing updating requests and reference requests to the shared memory from processes or objects in processes, said system comprising:

an area management unit which divides said shared memory into a plurality of areas and manages the updating requests and the reference requests to each divided area; and a timing unit which generates, for said area management unit, a reference timing signal;

wherein one of the processes having an updating request sends the reference request for referring to the areas of said shared memory to said area management unit, wherein said area management unit receives and processes the sent updating request, but delays its execution during a timing interval defined by the updating timing signal, then executes the updating request at the time when the updating timing signal is given from said timing unit, the reference requests from the processes are processed immediately throughout the timing interval, and wherein an identical time circumstance is provided to any of the objects in the processes sharing time, and an overhead of memory access is reduced when the shared memory is referred to by the processes or objects.

6. An updating and reference management system of a shared memory for managing updating requests and reference requests to the shared memory from processes or objects in processes, said system comprising:

an area management unit which divides said shared memory into an updating area and referencing area and manages each divided area; and a timing unit which generates, for said area management unit, a timing signal for copying the updating area onto the reference area;

wherein one of the processes having an updating request sends the reference request for referring to the areas of said shared memory to said area management unit, wherein said area management unit receives the sent reference request and immediately executes it, and wherein an identical time circumstance is provided to any of the objects in the processes sharing time, and an overhead of memory access is reduced when the shared memory is referred to by the processes or objects.

7. A reference timing control system of a shared memory for managing updating requests and reference requests to the shared memory from processes or objects in processes, said system comprising:

an object group which arranges data on said shared memory, an object management unit which controls an operation of said object group and a message transmission to said object group; and a timing unit which generates, for said object management unit, a control timing signal based on real time;

wherein one of the processes having an updating request sends the updating request for updating data on said shared memory to said object management unit; and wherein said object management unit delays an execution of the sent updating request by holding the sent updating request for a timing interval defined by the control timing signal as a message to the object which manages data corresponding to the sent updating request, then transfers the message and control to each object at the time when the control timing signal is given from said timing unit and executes the message, wherein said object group issues and updating notice to the processes indicating that said shared memory has been updated when executing said message, wherein the processes refer to said shared memory only when said updating notice is given, and wherein an identical time circumstance is provided to any of the objects in the processes sharing time, and an overhead of memory access is reduced when the shared memory is referred to by the processes or objects.

8. A reference timing control system of a shared memory for managing updating requests and reference requests to the shared memory from processes or objects in processes, said system comprising:

an object group which arranges data on said shared memory, an object management unit which controls an operation of said object group and a message transmission to said object group; and a timing unit which generates, for said object management unit, a control timing signal synchronized with a processing of the object;

wherein one of the processes having an updating request sends the updating request for updating data on said shared memory to said object management unit, wherein said object management unit delays an execution of the sent updating request by holding the sent updating request for a timing interval defined by the control timing signal as a message to the object which manages data corresponding to the sent updating request, then transfers the message and control to each object at the time when the control timing signal is given from said timing unit and executes the message, wherein said object group issues an updating notice to the processes indicating that said shared memory has been updated when executing said message, wherein the processes refer to said shared memory only when said updating notice is given, and wherein an identical time circumstance is provided to any of the objects in the processes sharing time, and an overhead of memory access is reduced when the shared memory is referred to by the processes or objects.

* * * * *